(12) United States Patent
Cooper

(10) Patent No.: US 6,182,238 B1
(45) Date of Patent: Jan. 30, 2001

(54) FAULT TOLERANT TASK DISPATCHING

(75) Inventor: Barnes Cooper, Beaverton, OR (US)

(73) Assignee: Intel Corporation, Santa Clara, CA (US)

( * ) Notice: Under 35 U.S.C. 154(b), the term of this patent shall be extended for 0 days.

(21) Appl. No.: 09/078,690

(22) Filed: May 14, 1998

(51) Int. Cl.[7] .................................................... G06F 11/00
(52) U.S. Cl. .................................. 714/2; 714/7; 714/38; 714/47; 709/107; 710/266
(58) Field of Search .................... 714/2, 3, 4, 7, 714/12, 13, 14, 38, 22, 43, 47, 34, 30, 48, 55, 814, 815; 370/220, 228; 710/260, 264, 266, 269; 709/100, 106, 107; 702/100, 89, 102, 119, 123, 125; 717/11; 711/103; 379/10

(56) References Cited

U.S. PATENT DOCUMENTS

| 4,356,546 | * | 10/1982 | Whiteside et al. .................. 714/10 |
| 4,628,158 | * | 12/1986 | Rubin ................................. 379/10 |
| 4,894,828 | * | 1/1990 | Novy et al. ........................ 714/711 |
| 5,091,847 | * | 2/1992 | Hebermann .......................... 714/3 |
| 5,581,692 | * | 12/1996 | Nevitt ................................. 714/22 |
| 5,892,893 | * | 4/1999 | Hanf et al. ........................... 714/3 |
| 6,009,370 | * | 12/1999 | Minowa et al. .................... 714/11 |

FOREIGN PATENT DOCUMENTS

09091170A * 4/1997 (JP) .

* cited by examiner

Primary Examiner—Robert W. Beausoliel, Jr.
Assistant Examiner—Pierre E. Elisca
(74) Attorney, Agent, or Firm—Trop, Pruner & Hu, P.C.

(57) ABSTRACT

A fault tolerant task dispatching technique schedules a plurality of tasks, monitors the progress of each task on a periodic basis, detects when a task has failed, and initializes a failed task in a manner that does not interfere with the execution of any non-failed task. Task granularity, afforded by the fault tolerant dispatch technique, allows each task (device service routine) to be designed substantially independently of any other task. This, in turn, can ease the design and implementation of individual tasks as well as their integration into a computer system.

27 Claims, 4 Drawing Sheets

FAULT TOLERANT TASK DISPATCHING

BACKGROUND

The invention relates generally to a fault tolerant task dispatcher.

Embedded controllers are a general class of micro controllers used to support original equipment manufacturer (OEM) specific hardware and software. Typically used in mobile computing platforms (e.g., notebook computers), micro controllers process signals to and from a variety of OEM devices such as keyboards, pointing devices, and thermal management systems. Modern micro controllers are single chip computers that include a central processing unit, read only memory, random access memory, communication ports, digital-to-analog and analog-to-digital converters, and a relatively large number of input-output ports. One function of a microcontroller is to off-load the computational resources (e.g., processor time) used to service an OEM device (e.g., a keyboard) from a computer system's host processor. One way a microcontroller provides this capability is through the execution of a series of device service routines known as a tasks. As shown in Table ZZ, a microcontroller continually executes a single thread wherein a watchdog timer (coupled to generate a microcontroller hardware reset operation when it expires) is repeatably reset while waiting for a device service routine to indicate it has completed. This approach may detect a hardware fault (e.g., microcontroller failing to execute any instructions), but would not detect if a device service routine (or the device itself) has failed.

TABLE ZZ

One Method of Processing Tasks

Task_Code_Label:
  :
  Reload Watchdog Timer
  :
  Check for Event from device-N
  Loop at Task_Code_Label Until Event Another way a microcontroller may off-load a host processor is shown in Table YY. In this approach, a multi-threaded environment allows a dispatcher thread and a task thread to execute separately from one another. The dispatcher thread schedules the execution of each device service routine in a round robin fashion, and is invoked every time a dispatch timer expires. When invoked, the dispatcher reloads a watchdog timer and then returns control to a specified task thread. The task thread loops waiting for its associated service routine to complete. As in the prior example, this approach would not detect if a device service routine (or the device itself) has failed.

TABLE YY

Another Method of Processing Tasks

Dispatcher:
  :
  Reload Watchdog Timer
  :
  Return to Task Execution
Task_Code_Label
  :
  Check for Event from device-N
  Loop at Task_Code_Label Until Event As evidenced by the preceding examples, a problem in many micro controllers is that if one task fails to terminate, the microcontroller becomes incapable of executing any further instructions (i.e., it is "hung"). This type of failure can force an end-user to power cycle the entire computer system (of which the microcontroller is but one component) in order to place it back into an operational state. Accordingly, there is a need for a dispatcher routine that is tolerant of one or more faults.

SUMMARY

In general, embodiments of the invention describe a microcontroller and method to dispatch tasks in a fault tolerant manner. One embodiment provides an interrupt service method that receives an interrupt, adjusts a plurality of timer values whose values are above a specified threshold (where each timer value is associated with one of a plurality of tasks), initializing a timer to generate the interrupt at a fixed time interval, and if a timer value associated with a task marked as executing is a specified value, then indicating that task as failed, else if a timer value associated with a task marked as executing is not the specified value, then resuming execution of the task marked as executing.

In another embodiment, a fault tolerant task dispatcher schedules a plurality of tasks for execution, monitors whether a task fails to complete execution, and initializes a task that is determined not to have completed execution within a specified time without interfering with the execution of another of said plurality of tasks.

DETAILED DESCRIPTION

The following embodiments are illustrative only and are not to be considered limiting in any respect.

Figure 1:
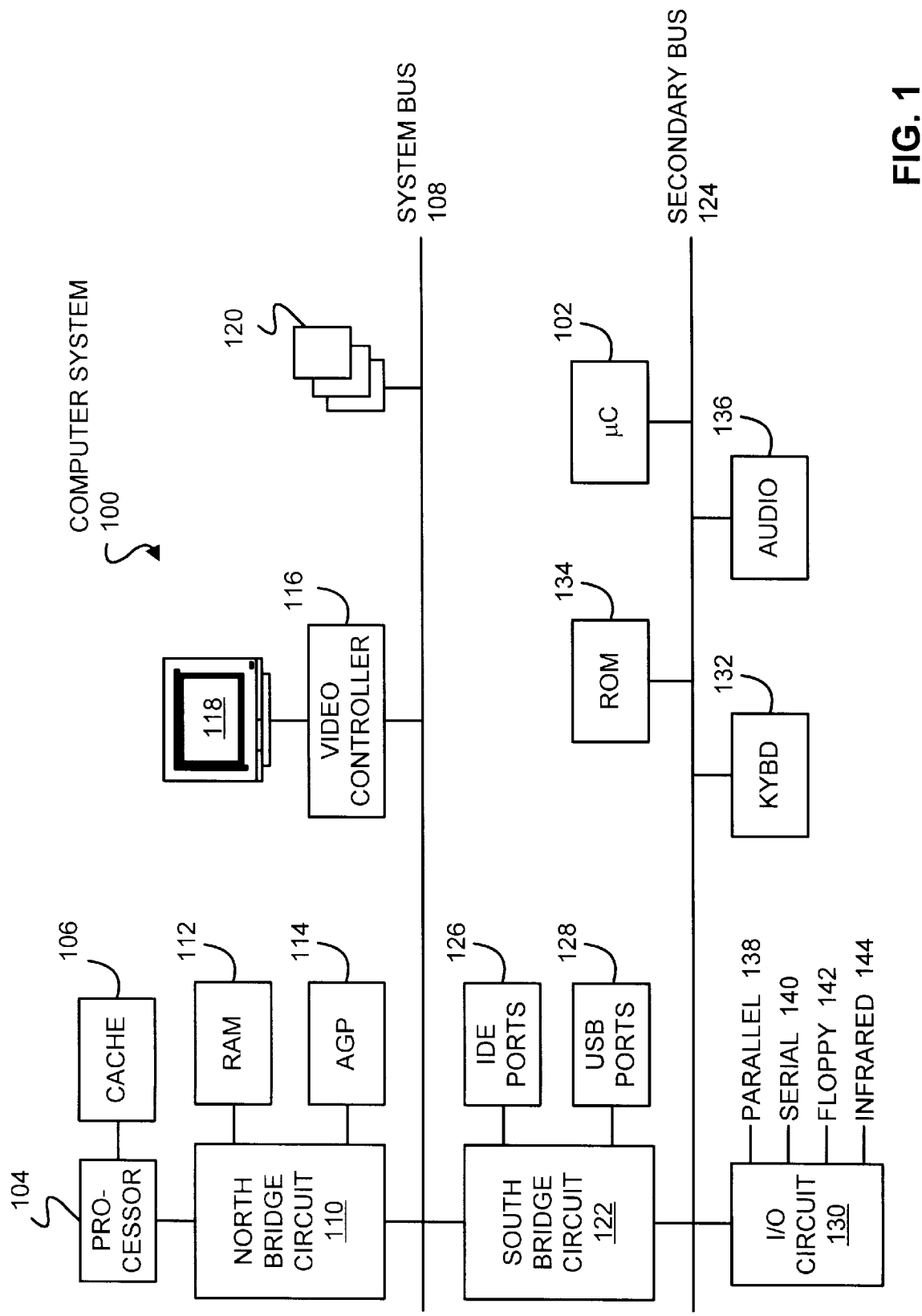
FIG. 1 shows an illustrative mobile computer system incorporating an embedded microcontroller in accordance with one embodiment of the invention.

Referring to FIG. 1, an illustrative mobile computer system 100 having a microcontroller (μC) 102 that uses an embodiment of fault tolerant dispatcher is shown. Computer system 100 includes host processor 104 and associated cache memory 106 coupled to system bus 108 through bridge circuit 110. Illustrative host processors 102 include the Pentium II® processor, the Pentium Pro® processor, the Pentium® processor, and the 80×86 families of processors from Intel Corporation. One illustrative bridge circuit 110 is the 82443LX PCI-to-AGP controller made by Intel Corporation.

Bridge circuit 110 provides an interface to couple system random access memory (RAM) 112 and accelerated graphics port (AGP) 114 devices. Also coupled to system bus 108 are video controller 116 and associated display unit 118, and one or more expansion slots 120. Expansion slots 120 may be personal computer memory card international association (PCMCIA) slots.

Bridge circuit 122 couples system bus 108 to secondary bus 124, while also providing integrated device electronics (IDE) 126 and universal serial bus (USB) 128 interfaces. Common IDE devices include magnetic and optical disk drives. Coupled to secondary bus 124 are microcontroller 102, input-output (I/O) circuit 130, keyboard controller (KYBD) 132, system read only memory (ROM) 134, and audio device 136. One illustrative bridge circuit 122 is the 82371AB PCI-to-ISA/IDE controller made by Intel Corporation. One illustrative microcontroller is the H8/3437 made by Hitachi corporation. Input-output circuit 130 may provide an interface for parallel 138 and serial 140 ports, floppy disks 142, and infrared ports 144.

Figure 2:
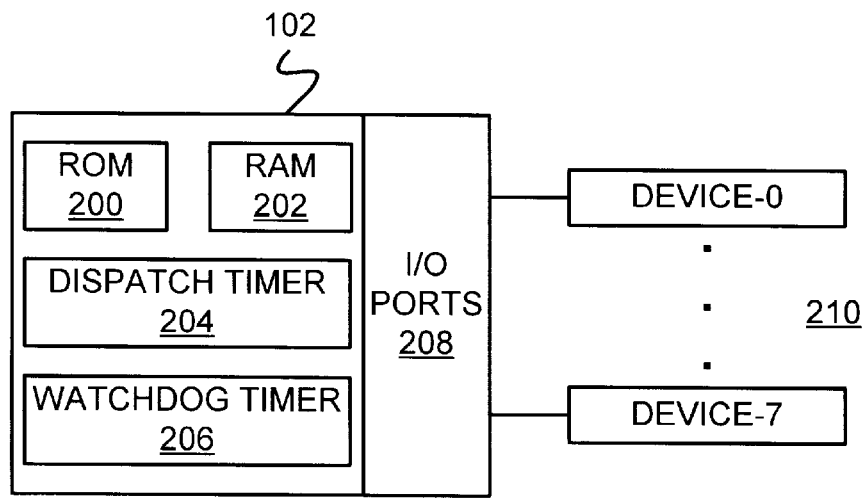
FIG. 2 shows an illustrative microcontroller for use in the computer system of FIG. 1.

Referring to FIG. 2, controller 102 includes read only memory (ROM) 200, random access memory (RAM) 202, dispatch timer 204, watchdog timer 206, and I/O ports 208 operatively connected to devices 210. Controller ROM 200 includes microcontroller firmware instructions, task initialization and service routines, dispatcher instructions, and some task data. Controller RAM 202 provides a limited amount of memory within which device service routines and fault tolerant dispatcher instructions are executed. RAM 202 may also provide storage for some operational parameters (see discussion below). Dispatch timer 204 is operatively coupled to generate a microcontroller interrupt when it expires (e.g., counts down to zero). The interrupt may be non-maskable or linked to dispatch timer 204 so that masking the interrupt would cause a controller reset operation. Watchdog timer 206 is operatively coupled to generate a microcontroller reset operation when it expires (e.g., counts down to zero). Input-output ports 208 provide an interface to connect the following devices (210): battery management; host interface; power plane management; docking station management; thermal management; peripheral control; keyboard controller communications; and system management bus (SMBus) controller.

Figure 3:
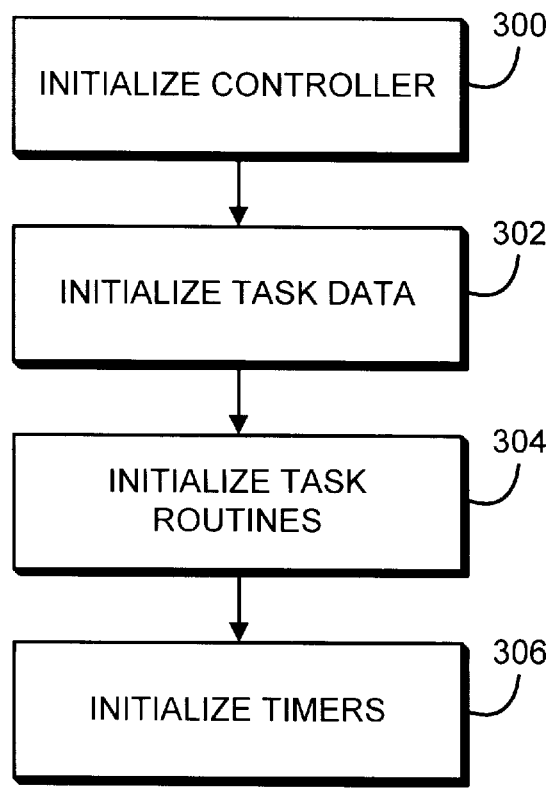
FIG. 3 shows a microcontroller initialization process in accordance with one embodiment of the invention.
Figure 4:
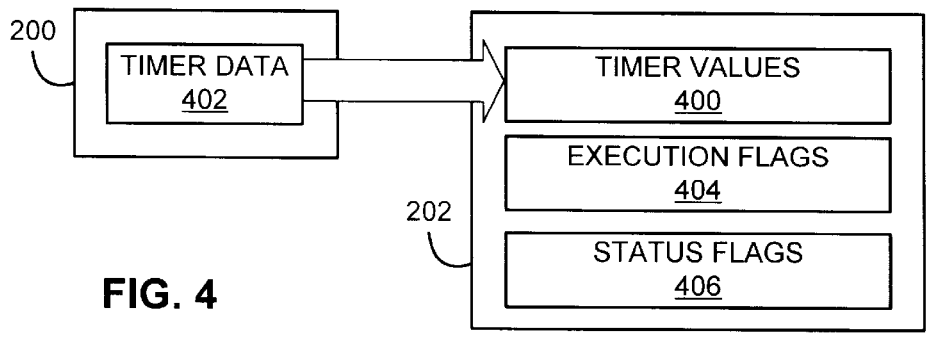
FIG. 4 shows one embodiment of FIG. 3's microcontroller read only and random access memories.

Referring to FIG. 3, on computer system 100 power-up or reset, controller 102 self-initializes by executing firmware instructions from ROM 200 (300) and task data are initialized (302). One aspect of initializing task data includes establishing a callback timer value in controller RAM 202 for each task to be scheduled by the task dispatcher. Callback times specify the amount of time the dispatcher should wait between subsequent calls to a task's TaskCallBack function; that routine which is periodically invoked by the dispatcher to service the task's device (see discussion below). Another aspect of initializing task data includes establishing a set of task execution flags and a set of task status flags for each task to be scheduled by the task dispatcher. Task execution flags (one for each task) are set to indicate a TaskCallBack function is currently executing, and cleared to indicate a TaskCallBack function is not executing. Task status flags (one for each task) are set to indicate a task has failed, and cleared when a task is initialized. As shown in FIG. 4, task callback timer values 400 are loaded into controller RAM 202 from controller ROM 200. Also included in ROM 200 timer data 402 are execution time values for each task. Each execution time value represents the amount of time the dispatcher should allow the associated TaskCallBack function to execute before determining it has failed (see discussion below). A portion of controller RAM 202 is also allocated to store task execution flags 404 and task status flags 406.

Returning to FIG. 3, following data initialization each task is initialized by executing its associated TaskInit function (304). If any TaskInit function fails to complete execution within a specified time period (stored in controller ROM 200's timer data 402), the task's status flag 406 is set to indicate the task has failed.

Once task data and task routines have been initialized, dispatch timer 204 and watchdog timer 206 are loaded with preset values (306). In general, dispatch 204 and watchdog 206 timers are continually running timers that begin counting down after being set/reset. The dispatch timer's preset value is typically between approximately 1 and 10 milliseconds, for example 5 milliseconds. The watchdog timer's preset value is typically between approximately 100 and approximately 500 milliseconds, for example 128 milliseconds. As discussed above, when dispatch timer 204 expires (e.g., counts down to zero from its preset value), an interrupt is generated that causes controller 102 to invoke an interrupt service routine which, in turn, invokes a fault tolerant dispatcher (see discussion below). When watchdog timer 206 expires, microcontroller 102 is reset. Resetting microcontroller 102 may cause computer system 100 to reset.

Figure 5:
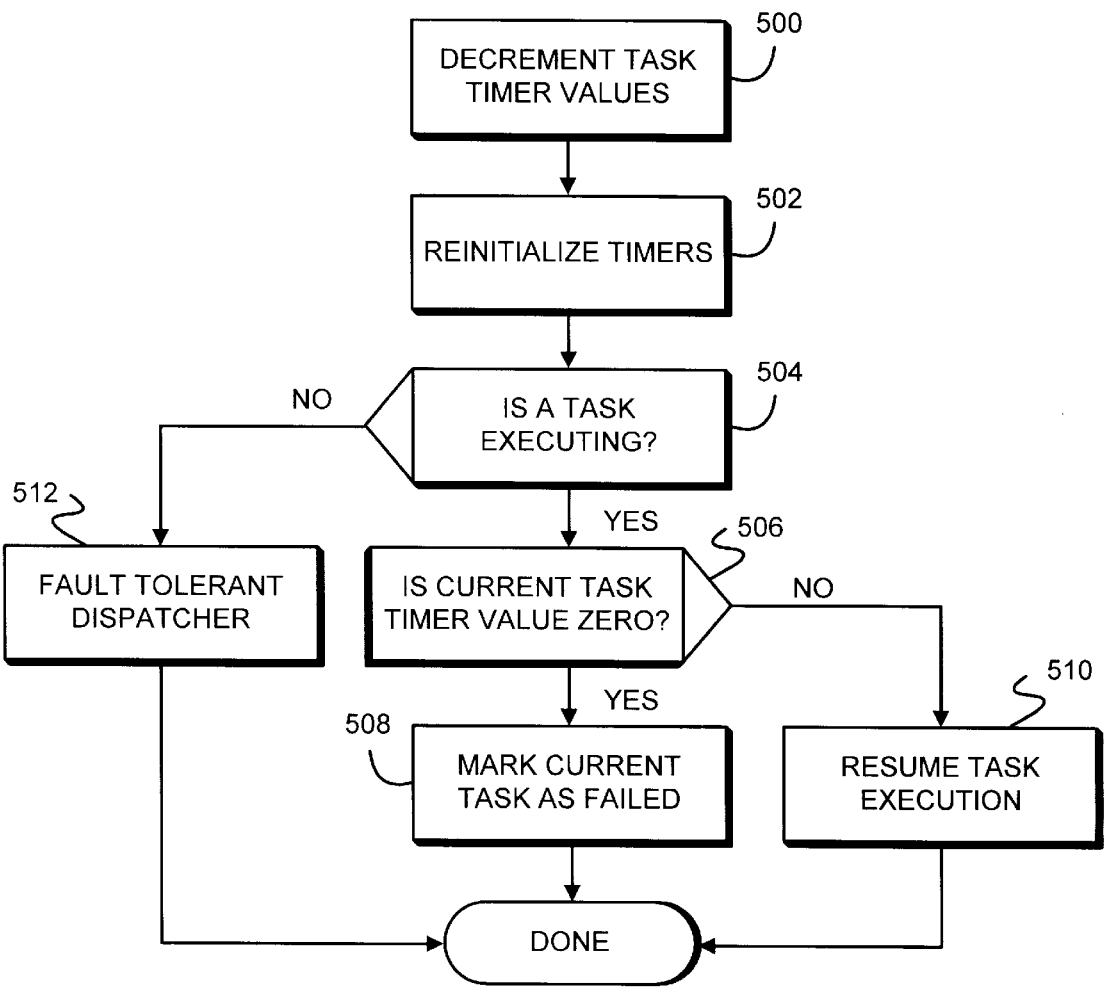
FIG. 5 shows an illustrative microcontroller interrupt service routine.

When dispatch timer 204 expires (causing an interrupt) a high priority interrupt service routine is executed as shown in FIG. 5. First, timer values 402 are adjusted to account for the time elapsed since the last interrupt (500); timer values are held, for convenience, at zero to avoid negative values. Next, dispatch timer 204 and watchdog timer 206 are reinitialized (502). Task execution flags 404 are then checked to determine if a task is currently being executed. If a task is currently executing (the 'yes' prong of 504), the timer value 400 associated with that task is checked to see if it is zero. If the executing task's timer value is zero (the 'yes' prong of 506), the task's associated status flag 406 is set to indicate the task has failed (508). If the executing task's timer value is not zero (the 'no' prong of 506), the interrupt service routine terminates and execution of the currently active task is resumed (510). If no task is currently executing (the 'no' prong of 504), the fault tolerant task dispatcher is invoked (512).

Figure 6:
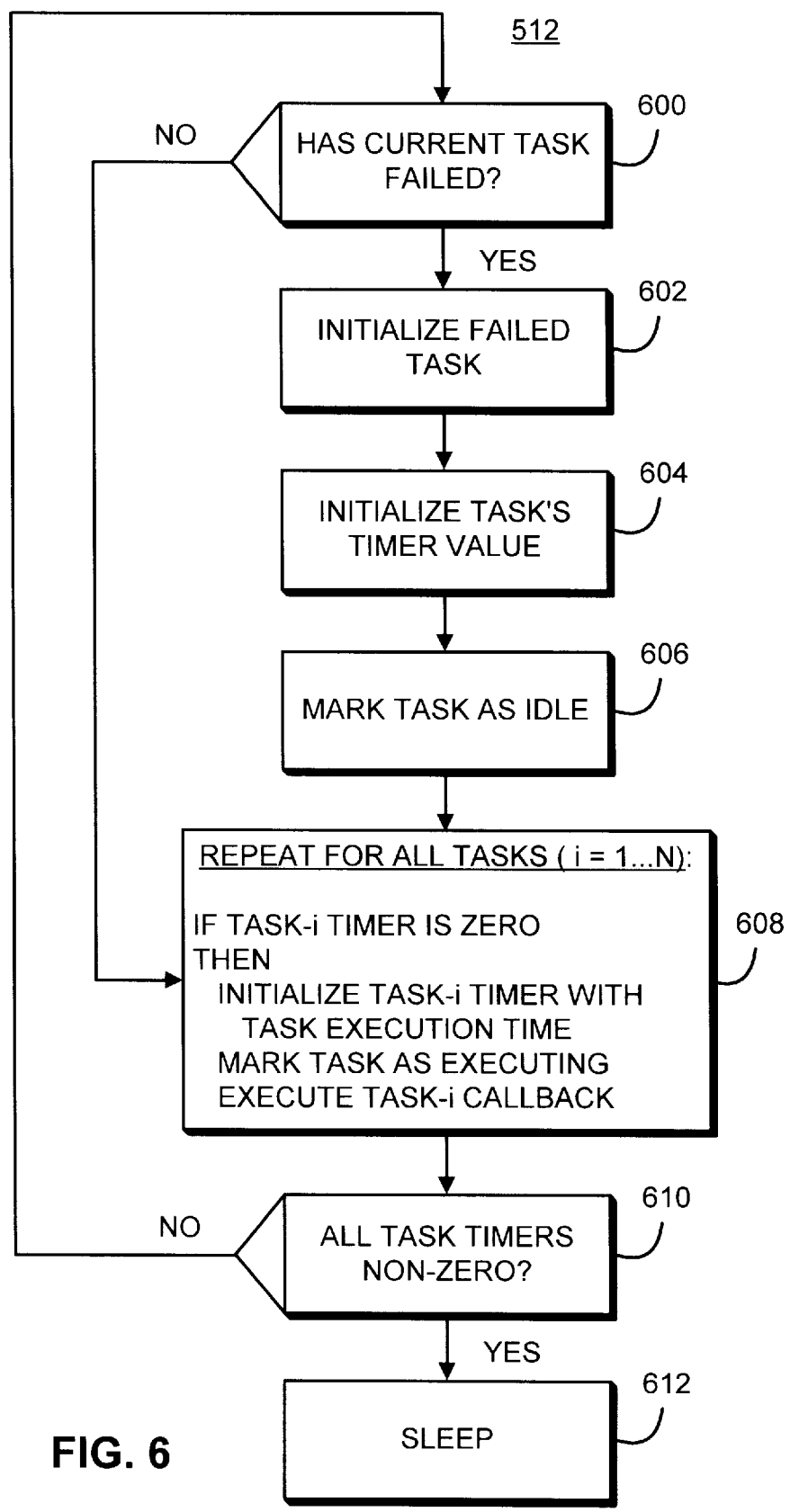
FIG. 6 shows an illustrative fault tolerant dispatcher process in accordance with the invention.

Referring to FIG. 6, one embodiment of a fault tolerant dispatcher begins by determining if the currently executing task has failed. If the current task's status flag 406 indicates it has failed (the 'yes' prong of 600), the task is reinitialized by invoking its TaskInit function (602), initializing the task's timer value 400 to its specified callback timer value (604), and marking the task as idle by clearing its execution flag 404 (606). (Marking may be done by having a flag value for each task scheduled by the task dispatcher. If the flag associated with a task is set, for example, the task is said to be marked.) Following 606, or if the currently executing task has not failed (the 'no' prong of 600), a loop is entered during which it is determined if any task is ready for execution (608). Specifically, for each task whose timer value has reached zero (adjusted in 500 of FIG. 5), the task's timer value 400 is loaded with its associated execution timer value 402; its execution flag 404 is set to indicate it is currently executing; and its associated TaskCallBack function is executed. If no task timer is zero (the 'yes' prong of 610), the dispatcher enters a low power or sleep state (steep 612). If all task timer values are non-zero (the 'no' prong of 610), the dispatcher begins again from 600. A check for zero value timers is performed at 610 because in between performing 608 and 610, a dispatch timer 204 interrupt could have occurred invoking the interrupt service routine of FIG. 5. This, in turn, could result in one or more timers being adjusted to zero.

The combination of dispatch timer and watchdog timer provides controller 102 with the ability to detect both software faults (via dispatch timer 204) and hardware faults (via watchdog timer 206). If a device service routine (software) hangs, dispatch timer 204 may expire and cause an interrupt. Through this interrupt, the hung routine may be effectively bypassed. If controller hardware fails so that neither the interrupt service routine of FIG. 5 or the fault tolerant dispatcher of FIG. 6 may execute, watchdog timer 206 may expire causing microcontroller 102 to reset.

The combination of interrupt service routine (e.g., FIG. 5) and fault tolerant dispatcher (e.g., FIG. 6) provides a granularity of task scheduling that affords a level of fault tolerance (to device service routine failures) not available in prior dispatchers. For example, if controller 102 is responsible for N devices, each of the devices' N TaskCallBack functions may fail independently without affecting the controller's ability to manage the other devices. An added benefit of this task dispatch granularity is that each task (device service routine) may be designed (coded) substantially independently of any other tasks. This may ease the design and implementation of individual tasks as well as their integration into microcontroller 102 and computer system 100.

Various changes may be made in the foregoing illustrative embodiments without departing from the scope of the claims. For example, dispatch and watchdog timers could be incorporated within the microcontroller or be external to the microcontroller. The identity and number of tasks scheduled by the dispatcher can be less than, or more than the eight described. In addition, system bus 108 and secondary bus 124 may be proprietary or special purpose buses, peripheral component interface (PCI) buses, industry standard architecture (ISA) buses, extended industry standard architecture (EISA) buses, or combinations of one or more of these busses. The methods of FIGS. 5 and 6 may be performed by a computer processor executing instructions organized into program modules. Storage devices suitable for tangibly embodying computer program instructions include all forms of non-volatile memory including, but not limited to: semiconductor memory devices such as EPROM, EEPROM, and flash devices; magnetic disks (fixed and floppy); other magnetic media such as tape; and optical media such as CD-ROM disks.

What is claimed is:

1. A microcontroller for controlling a plurality of devices through device service routines, comprising:
    a dispatcher to schedule the plurality of device service routines for execution;
    a detector to detect when a device service routine fails to complete execution within a specified time period; and
    a circuit to terminate the failed device service routine and to dispatch another of the plurality of the device service routines.

2. The microcontroller of claim 1, wherein the specified time period is determined by a timer.

3. The microcontroller of claim 2, wherein the timer is configured to generate a periodic interrupt.

4. The microcontroller of claim 3, wherein the periodic interrupt is a non-maskable interrupt.

5. The microcontroller of claim 1, wherein the specified time period is between approximately 1 millisecond and approximately 10 milliseconds.

6. An interrupt service method comprising:
    receiving an interrupt;
    adjusting a timer value, the timer value associated with a device service routine;
    initializing an interrupt timer to generate the interrupt at a fixed time interval;
    marking the device service routine as failed if the adjusted timer value is a specified value; and
    resuming execution of the device service routine if the adjusted timer value is not the specified value.

7. The method of claim 6, wherein the interrupt is a non-maskable interrupt.

8. The method of claim 6, wherein the fixed time interval is between approximately 1 millisecond and approximately 10 milliseconds.

9. The method of claim 6, wherein the fixed time interval is 5 milliseconds.

10. The method of claim 6, wherein marking comprises setting a flag associated with the device service routine.

11. The method of claim 6, wherein the specified value is less than or equal to zero.

12. The method of claim 6, wherein adjusting comprises decrementing the timer value.

13. The method of claim 6 wherein resuming execution further comprising entering a low power mode.

14. A fault tolerant task dispatching method comprising:
    identifying a current task from a plurality of tasks, each task associated with a timer value and information indicating whether the task is executing and whether the task is failed;
    initializing the current task if it is indicated as failed;
    identifying a next task; and
    scheduling the next task if the timer value associated with the next task is a specified value.

15. The method of claim 14, wherein the specified value is less than or equal to zero.

16. The method of claim 15, further comprising entering a low power mode if the timer values associated with each task is not the specified value.

17. The method of claim 14, wherein initializing comprises:
    executing an initialization routine associated with the failed task;
    setting a timer value associated with the failed task; and
    indicating the failed task as idle.

18. The method of claim 17, wherein the timer value is greater than zero.

19. The method of claim 14, wherein scheduling comprises:
    executing a task initialization routine associated with the next task;
    setting a timer value associated with the next task;
    indicating the next task as executing; and
    executing a device service routine associated with the next task.

20. The method of claim 19, wherein the timer value is between approximately 1 millisecond and approximately 10 milliseconds.

21. A program storage device, readable by a computer system, having instructions stored thereon for causing the computer system to:
    identify a current task from a plurality of tasks, each task associated with a timer value and information indicating whether the task is executing and whether the task is failed;
    initialize the current task if it is indicated as failed;
    identify a next task; and
    schedule the next task if the timer value associated with the next task is a specified value.

22. The program storage device of claim 21, wherein the specified value is less than or equal to zero.

23. The program storage device of claim 21, further comprising instructions to enter a low power mode if the timer values associated with each task is not the specified value.

24. The program storage device of claim 21, wherein the instructions to initialize include instructions to:
- execute an initialization routine associated with the failed task;
- set a timer value associated with the failed task; and
- indicate the failed task as idle.

25. The program storage device of claim 24, wherein the timer value is greater than zero.

26. The program storage device of claim 21, wherein instructions to schedule include instructions to:
- execute a task initialization routine associated with the next task;
- set a timer value associated with the next task;
- indicate the next task as executing; and
- execute a device service routine associated with the next task.

27. The program storage device of claim 26, wherein the timer value is between approximately 1 millisecond and approximately 10 milliseconds.

* * * * *